Figure 1:
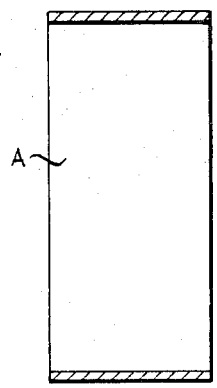

United States Patent [19]

Ramaratnam et al.

[11] 4,397,345
[45] Aug. 9, 1983

[54] MANUFACTURE OF RIMS FOR THE WHEELS OF ROAD VEHICLES

[75] Inventors: Krishnaswamy Ramaratnam; Kuzhumani M. Natarajan, both of Madras, India

[73] Assignee: Wheels India Ltd., India

[21] Appl. No.: 16,833

[22] Filed: Mar. 2, 1979

[51] Int. Cl.³ .................. B21K 1/38; B60B 25/18
[52] U.S. Cl. .................... 152/406; 152/410; 301/97; 29/159.1; 72/354; 72/359; 413/15
[58] Field of Search .................. 301/95–97; 29/159.1, 159.01; 113/116 D; 152/405–410; 72/358–359, 356, 354

[56] References Cited

U.S. PATENT DOCUMENTS

| | | | |
|---|---|---|---|
| 1,711,182 | 4/1929 | Shrum | 72/354 |
| 2,944,502 | 7/1960 | Lemmerz | 72/354 |
| 3,197,996 | 8/1965 | Zeder, Jr. | 72/354 |
| 3,706,120 | 12/1972 | Bulgrin | 29/159.1 |
| 3,846,886 | 11/1974 | Schroder et al. | 29/159.1 |
| 4,050,135 | 9/1977 | Luedi | 29/159.1 |
| 4,127,022 | 11/1978 | Bosch | 29/159.1 X |
| 4,143,533 | 3/1979 | Bosch | 29/159.1 X |
| 4,238,949 | 12/1980 | Roper | 72/358 |

FOREIGN PATENT DOCUMENTS 484853  5/1938  United Kingdom .................. 72/354

Primary Examiner—Charles A. Marmor
Attorney, Agent, or Firm—Stevens, Davis, Miller & Mosher

[57] ABSTRACT

Apparatus for the manufacture of a rim for the wheel of a commercial load carrying or passenger service vehicle, which apparatus comprises in combination bending apparatus for bending steel strip and butt welding the edges thereof to form a cylindrical component and a plurality of press tools for converting the component into a rim wherein at least one of the press tools comprises an annular die having located within the opening thereof pressure plate adapted to ascend or descend within such opening and on which a cylindrical component to be formed into the rim is adapted to be located above the bottom of the annular die, and pressure elements mounted above the die and adapted to engage therewith through its opening in such a way as to subject the component to compressive load against the inner surface of the die whereby the contour of the die or of the die and the pressure elements is imparted to the component, wherein the pressure elements comprises a combination of upper and lower punch tools resiliently inter-connected and so formed that when the combination descends, only the lower punch tool moves in advance of the upper punch tool to provide lateral support to the component and thus prevent its buckling under the substantially vertical pressure to which it is subjected by the upper punch tool.

14 Claims, 12 Drawing Figures

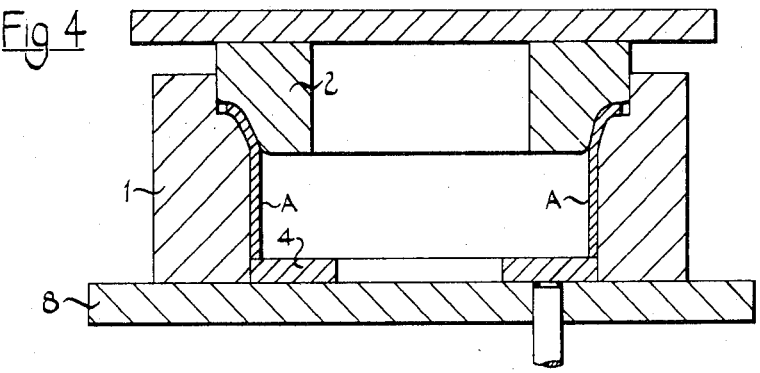
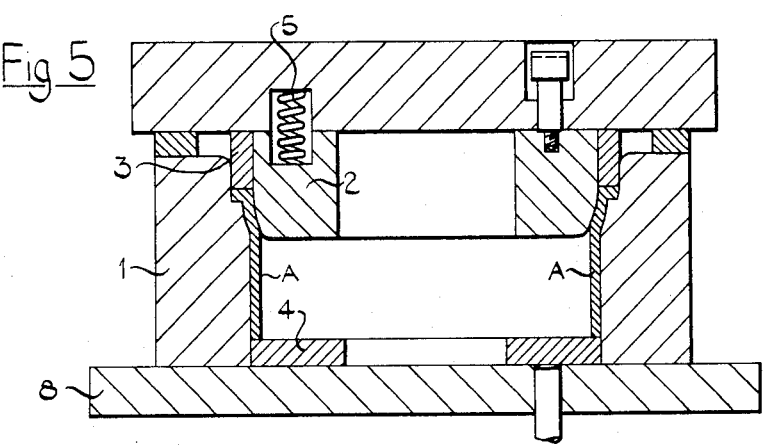
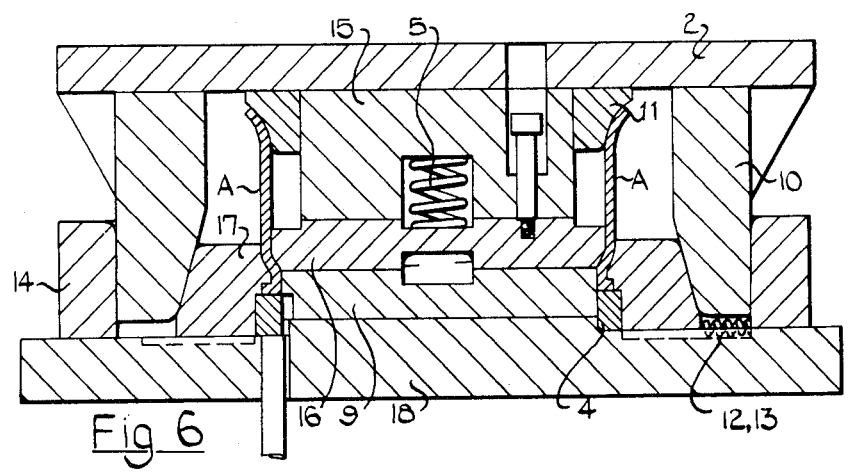

MANUFACTURE OF RIMS FOR THE WHEELS OF ROAD VEHICLES

The present invention relates to a metal rim for a road vehicle wheel and especially to a novel method for the manufacture of such a rim. The method of the invention relates particularly, but not exclusively, to the manufacture of 5° taper base/flat base rims for the wheels of commercial load carrying or passenger service vehicles.

As is well-known, the rim of a wheel constitutes that portion of the latter on which the tyre, which for all practical purposes is always a pneumatic tyre, is mounted and supported. A rim conforms generally in configuration to a circular hoop one end of which is formed with a fixed flange adapted to retain the tyre head and the other end shaped to provide a gutter adapted to receive either a split lockring which locates a detachable tyre bead retaining flange or a split tyre bead retaining ring. The rim with lockring and detachable tyre bead retaining flange constitutes what is known conventionally as a three-piece wheel. Likewise, the combination of rim and split tyre bead retaining ring is known as a two-piece wheel.

In the part, rim manufacturers were wont to employ as their starting material hot rolled mill steel sections specially profiled to produce, on being subjected to rim formation steps, rims of the desired shape and construction. Such steps generally comprised bending the profiled sections to form a hoop, butt welding the contiguous ends together and sizing the hoop so formed to provide the finished rim.

Unfortunately, such a production system suffered from two main drawbacks, namely (i) inability to obtain a sufficient supply of profiled sections and (ii) the consequential expense in respect of an item in such relatively short supply. Since the production of such specially profiled sections required an advanced degree of technology, there were understandably not many suppliers thereof. As a result the rim manufacturer was forced to be dependent on just a few mills specialising in the rolling of profiled sections. This factor alone would have been instrumental in increasing the cost of such sections. In addition to this, however, there was the fact that the vary nature of a rolling mill is such that it lends itself to the production of a low cost product only when producing in very large bulk. Since it frequently happens that only a small quantity of rims is required, the use of profiled steel sections turned out to be economically prohibitive.

As an alternative to the use of profiled steel sections, rim manufacturers have in recent years turned to employing plain flat steel strip as the starting material in the production of wheel rims and a number of manufacturing systems have been devolved. It will be immediately appreciated that the manufacture from uniformly dimensioned steel strip of a fully profiled rim with its essential requirements of varying thickness at different locations, is extremely difficult. In order to produce a rim which is strong enough to withstand, the extremely heavy forces of stress to which it will be subjected in the course of its use, it is absolutely imperative to reinforce the rim by thickening the strip or section employed at critical locations corresponding to the eventual rim to at least the base angle or corner of the tyre bead retaining flange and that of the gutter. Unless each thickness can be ensured, the necessary strength and safety of the wheel cannot be guaranteed.

Of the several prior art systems relating to the production of profiled rims from flat steel strip, one is described in British Pat. No. 770685. According to the method of this patent, steel strip of draw quality is bent and butt welded into a hoop which is then cold worked by subjecting it in cold condition to compressive load in a press tool. This working increases the thickness of the corners of the gutter and the tyre bead retaining flange relatively to the rest of the rim but not sufficiently to ensure requisite stability and safety in the final wheel.

According to another method, draw quality steel strip is employed which as a starting material possesses the thickness desired in the maximum stress areas of the finished rim, namely the corners of the gutter and tyre bead retaining flange. This method envisages forming a cylindrical band from strip of the above-stated thickness and thereafter profiling the band in a flowforming machine through a series of cold working operations to reduce drastically the thickness of the band in areas of low stress.

Perhaps the most efficient prior art method for the manufacture of profiled wheel rims from steel strip is the one described and claimed in U.S. Pat. No. 4,050,135. The method according to this patent employs a flat strip of hot rolled rimmed low carbon steel which is formed into the shape of a smooth cylinder and welded along the abutting axial edges. The cylinder is then worked on by means of press tools to provide the requisite contour thereto with increased radial thickness in the region of the gutter. The method involves heating the gutter and the cylinder from 800° to 1200° F. before introducing the cylinder into the press tool. The compressive load to which the cylinder is subjected, increases the thickness of the heated gutter portion by 30% to 50% over the thickness of the initial steel strip and simultaneously rough forms the gutter profile and flares the fixed tyre bead retaining flange. In the sequence of steps employed, the top die of the press tool is raised slightly to permit the die segments to retreat inwardly according to a predetermined arrangement whereafter the die is depressed to rough form the fixed flange end. However, the method of U.S. Pat. No. 4,050,135 also includes as an essential step therein the shear forming of the flat base portion of the rim in order to reduce the thickness thereof in areas of low stress located between the gutter and the fixed flange. This reduction in thickness is effected as a subsequent and an entirely separate step from the main steps of press tool working the cylinder in order to thicken the gutter. Finally, the rim according to U.S. Pat. No. 4,050,135 is roll formed to finish the profile.

The method of U.S. Pat. No. 4,050,135 while indeed constituting a considerable improvement over earlier known methods, nevertheless suffers from the fact that it is able to increase the thickness of the gutter end of the rim by only about 30% to 50% over the initial thickness of the steel strip. On the other hand, it does not increase the thickness of the fixed flange end of the rim at all over that of the initial strip. In addition, the method includes the essential and altogether separate step of shear forming the base of the rim in order to reduce the thickness thereof in relation to the thickness of the gutter and the fixed flange ends. Furthermore, the method is restricted only to the formation of flat base truck rims.

In contradistinction, the method of the present invention aims at providing an efficient comprehensive manufacturing procedure for the production from flat steel strip or plate of improved profiled rims for the wheels of both commercial load carrying and passenger service vehicles. The method employs as starting material standard mill plate, sheet metal or strip steel which is subjected to a sequence of forming and shaping operations through a plurality of shaping tools to provide a profiled rim properly reinforced and thickened at the essential major stress areas.

It is, therefore, the principal object of the invention to provide an improved method for the manufacture from low carbon steel strip or plate of a rim for the wheel of a vehicle having the required profile and being requisitely reinforced by thickening of the strip or plate forming the rim at essential stress areas.

A secondary object of the invention is an improved method for the manufacture of a wheel rim in which the thickness achieved at the radial corner of the gutter is greater by as much as 90% than the thickness of the initial wheel strip and the thicknesses of the gutter base, the vertical gutter wall and the radial corner of the tyre bead retaining flange are greater by as much as 50% than the thickness of the initial strip.

Another object of the invention is the provision of a method which is capable of being worked with substantially standard equipment for the manufacture of wheel rims at relatively high speeds of production and which possesses a high degree of flexibility in process sequence in order to permit rims of varying configurations and thicknesses to be manufactured substantially continuously.

Yet another object of the invention is the provision of a wheel rim manufactured by a combination of cold and hot pressings and roll forming operations which rim possesses the characteristics and advantages stated above.

A still further object of the invention is the provision of a 5° taper base/flat rim for the wheel of a commercial load carrying or passenger service vehicle having the configuration, characteristics and advantages stated above.

With the above objects in view, the present invention provides an improved method for the manufacture from low carbon steel strip or plate of rims for the wheels of both commercial load carrying and passenger service vehicles, each rim being composed of a base portion having a gutter for receiving a tyre lockring extending round one end and a fixed tyre bead retaining flange round the other, the method comprising bending a steel strip of substantially uniform predetermined thickness into the form of a circle and butt welding the contiguous axial edges to form a cylinder, cold working the cylinder in order to conform the diameter and dimensions thereof to subsequent operational requirements and simultaneously to flare one end of the cylinder to form the rim gutter, heating the flared gutter portion and subjecting the heated portion to compressive load in order to form the vertical wall of the gutter flange and increase the thickness of both the said wall and the radial corner of the gutter, cold working the semiformed rim in order to form the profile of the gutter and simultaneously to flare the opposite end of the cylinder to form the tyre bead retaining flange, and finally subjecting the flared flange portion to compressive load in order to form the profile of the flange.

According to a preferred feature of the method, the flared flange portion is first heated before being subjected to compressive load in order to form the profile of the flange, which loading results in increasing the thickness of the strip at or near the radial corner of the flange.

The invention also provides an improved method for the manufacture from low carbon steel strip of plate of rims for the wheels of both commercial load carrying and passenger service vehicles, each rim being composed of a base portion having a gutter for receiving a tyre lockring extending round one end and a fixed tyre bead retaining flange round the other, the method comprising bending a steel strip of substantially uniform predetermined thickness into the form of a circle and butt welding the continuous axial edges to form a cylinder, cold working the cylinder in order to conform the diameter and dimensions thereof to subsequent operational requirements and simultaneously to flare one end of the cylinder to form the rim gutter, heating the flared gutter portion and subjecting the heated portion to compressive load as a result of which the thickness of the strip in the areas of the gutter increases, cold working the heated gutter portion in order to reflare it, subjecting the reflared gutter to further heat and compressive load in order to form the vertical wall of the gutter flange and to increase the thickness of the entire gutter portion composed of the said vertical wall, gutter base and radial corner of the gutter, cold working the semiformed rim in order to form the profile of the gutter and simultaneously to flare the opposite end of the cylinder to form the tyre bead retaining flange, and finally heating the flared flange portion and subjecting the heated portion to compressive load in order to farm the profile of the flange as a result of which the thickness of the strip in the area of the flange and particularly the radial corner of the flange increases.

During the hot working stages, it is preferred to employ temperatures above the critical range for heating the rim gutter and tyre bead retaining flange. Generally, temperatures in the range of from 850° C. to 1100° C. are employed. The advantage of using such high temperatures lies in the fact that they produce a highly desirable normalised type of structure and the plasticity of the steel strip at these temperatures greatly facilitates the achievement of complex profiles and higher thickness as warranted by product design.

As the final step in the production of the rim, the gutter and tyre bead retaining flange are roll-formed to refine them to the final rim profile.

The present invention also provides a rim for the wheel of a commercial load carrying or passenger service vehicle whenever manufactured from low carbon steel strip or plate by the method described herein.

A particularly preferred rim according to the invention is one having a 5° taper base/flat base wherein the thickness of the radial corner of the gutter is greater by as much as 90% than the thickness of the initial steel strip from which it was manufactured and the thicknesses of the gutter base, the vertical gutter wall and the radial corner of the tyre bead retaining flange are greater by as much as 50% than the thickness of such initial steel strip.

Figure 1A:
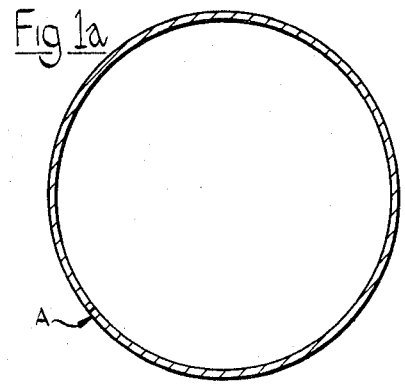

The invention will now be described in greater detail with reference to the accompanying drawings in which:

FIG. 1 represents a transverse section of the cylinder formed after butt welding a steel strip, FIG. 1A represents a horizontal cross-section of such a cylinder, FIGS. 2 to 7 represent vertical cross-sectional views of a series of press tools illustrating the various stages in the working of the component, i.e. the cylinder, in order to form the desired rim of the invention.

Figure 8:
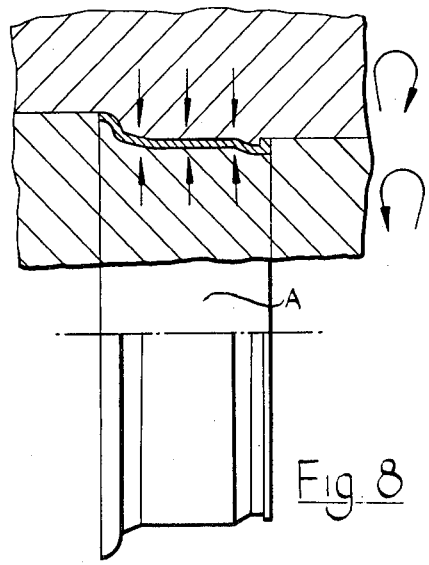
Figure 9:
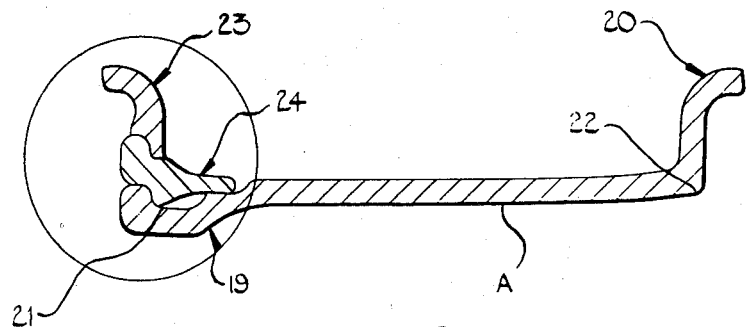
Figure 10:
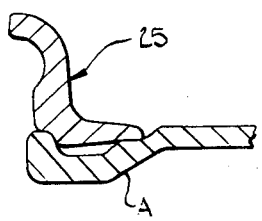
Figure 11:
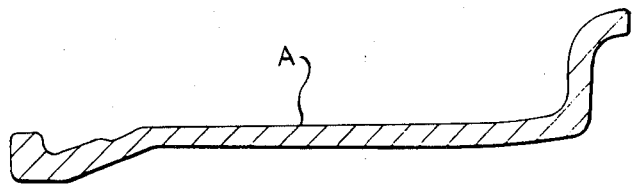

FIG. 8 is a view, partly in section, of the rim of the invention in the course of being subjected to final roll-forming for refining its profile, FIG. 9 is a transverse sectional view of a conventional three-piece rim assembly, FIG. 10 is a fragmentary transverse sectional view of a conventional two-piece rim assembly, and FIG. 11 is a transverse sectional view of a rim manufactured by the method of the present invention.

With reference to the drawings, a length of steel strip or plate having a chosen width and thickness is bent into the form of a circle and the axial edges are butt welded to produce a Cylinder A, cross-sectional views of which taken through the horizontal and vertical axes of the cylinder are shown in FIGS. 1 and 1A. The strip is so chosen as to enable those areas in the finished rim which will be subjected to high stress to have their thicknesses substantially increased with respect to the thickness of the initial strip.

Figure 2:
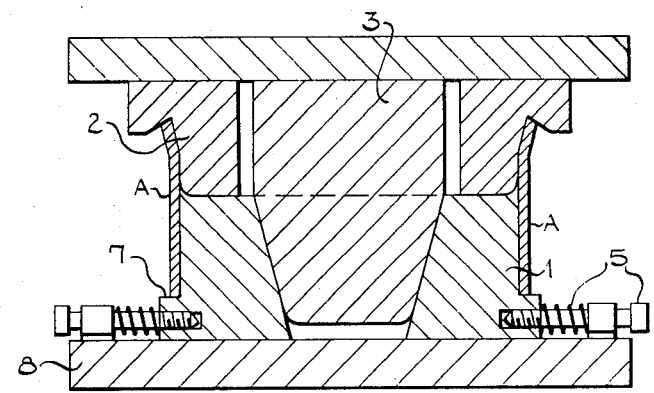

After formation of the cylinder A, the latter is fed into a press tool as shown in FIG. 2. Such press tool comprises a punch 2 provided with a downwardly extending cone 3 adapted to engage the opening of an annular segmental die 1 which is mounted on a platform 8 and controlled by collapsible spring 5. The cylinder component A is placed about the segmental die 1 where it rests on an external groove 7 provided in the periphery of the die 1, punch 2 is then lowered and cone 3 engages the opening in the die causing the latter to expand radially outward. This radially outward expansion of the die 1 causes cylinder component A to expand to the desired diameter and thereby facilitates truer location of the cylinder during subsequent operations. Furthermore, as punch 2 closes with die 1, it causes a simultaneous flaring of the cylinder component A to take place in the area corresponding to the gutter of the finished rim. After completion of the flaring and the regularisation of the size and dimensions of component A, the latter is removed by collapsing springs 5 and moving segmental die inwards.

After the operation described with reference to FIG. 2, the component A with its flared gutter portion is then subjected to heating by any suitable heating means such as an induction heater. Heating is concentrated on the flared portion and this ensures easy flow of material so that an increased thickness in the area of the gutter portion is obtained.

Figure 3:
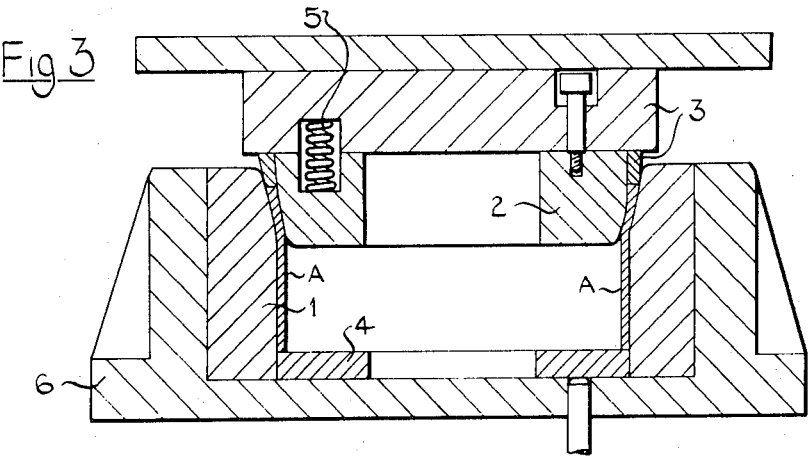

Heated component A is now fed into a press tool as shown in FIG. 3. This tool comprises a circular die 1 mounted within a die holder 6. A combination of lower and upper punches 2 and 3 mounted above die 1 are adapted to engage the opening in such die. Heated component A is loaded on to a pressure plate 4 located in the opening of die 1. Preferably, the component A lies in a groove (not shown) of the upper surface of pressure plate 4. The lower and upper punches 2 and 3 are resiliently connected by means of a spring arrangement 5. This spring arrangement ensures that lower punch 2 moves in advance of upper punch 3 when the combination of the punches is on its downward movement and this provides support to the heated gutter portion of the component thus preventing buckling thereof. As the combination of punches 2 and 3 descend on to the component, they press downward into the opening of die 1 until pressure plate 4 comes to rest on the bottom of the die opening. The pressure on the heated gutter region exerted by the combination of dies causes such region to thicken. Furthermore, by controlling the heat applied to the gutter portion to between 850° C. and 1100° C., no undue stresses are introduced into the structure of the component, the material of which remains homogenous.

For heating the component, applicants have found it extremely convenient and reliable to employ an induction heater comprising a rotary table, a specially designed inductor arrangement for heating the cylinder components and a locator for locating the component in position on the rotary table which revolves at a predetermined speed during the heating cycle.

The component A with its thickened gutter portion may next be subjected to the reflaring of such portion by treatment in a press tool as shown in FIG. 4. Such reflaring is resorted to when a rim is intended for particularly heavy duty vehicles. The general principle of operation of the press tool shown in FIG. 4 is similar to that of FIG. 3 though of course alterations of construction have of necessity to be present in order to achieve the purpose in question.

Referring to FIG. 4, component A with its thickened gutter portion is placed without additional heating on pressure plate 4 located in the opening of die 1. Punch 2 is lowered causing pressure plate 4 to descend and the gutter portion of the component is reflared under pressure between die 1 and punch 2. After reflaring, pressure plate 4 on which component A is located, acts as an ejector to remove or unload the component from the press tool.

After reflaring of the gutter portion, component A is subjected to local heating in the region of the reflared portion in a manner such as described earlier, preferably employing the induction heater of the stated construction. The temperature range for the heating is from 850° C. to 1100° C. so that no undue stresses are introduced into the component after the subsequent forming operation and there is a self-normalising procedure that takes place within the component as it cools down.

In order to obtain the required extra thickness of the gutter portion and simultaneously to form the vertical wall of the gutter flange, heated component A is next subjected to working in a press tool of the construction shown in FIG. 5. The general principle of operation of this tool is the same as that illustrated in FIGS. 3 and 4. The tool of FIG. 5 comprises an annular die 1 provided with a pressure plate 4 located within the die opening and a combination of punches adapted to engage the die 1 from above. This combination comprises a lower punch 2 and an upper punch 3 interconnected by means of a resiliently operable connection, such as spring system 5, so that when the combination of punches is operated, lower punch 2 moves in advance of upper punch 3.

Heated component A is located on pressure plate 4 preferably in a peripheral groove (not shown). The pressure plate lowers as the combined forming punch closes pressing the gutter area of the component against die 1 which has the necessary predetermined shape. This pressing operation imparts the required thickness to the radial corner of the gutter and simultaneously forms the vertical wall of the gutter flange.

Following the working of component A in the tool illustrated in FIG. 5, which operation increases substantially the thickness of the entire gutter portion, the component is ready for profiling of the gutter zone and formation of the fixed tyre bead retaining flange. To achieve this, the component is subjected to cold working operation in a press tool as shown in FIG. 6. This tool comprises an upper tool or bolster 2 adapted to move downwards in the general direction of lower tool or bolster 18. Located on the top of bolster 18 is a base ring 9 which has a peripheral profile corresponding to the profile desired to be imparted to the rim gutter. Attached to upper tool 2 are a cam ring 10, a punch 11 and a stripper composed of upper and lower portions 15 and 16 which are secured to tool 2 by means of a spring arrangement 5.

Component A on release from the tool described in FIG. 5 and without any further heating is mounted in position on pressure plate 4 which is thereafter lowered until it rests on lower bolster 18 such that the gutter zone of component A makes peripheral contact with base ring 9. Upper tool 2 is lowered causing stripper portions 15 and 16 to press down on base ring 9. At this stage, cam ring 10 is contracted thereby compressing segmental contractor blocks 17 which move radially inward and press the gutter portion of component A positively against the profile provided by base ring 9 and lower stripper portion 16. This action forms the profile of the gutter zone of the rim.

Simultaneously with the formation of the gutter zone profile, the opposite end of component A is contacted by the downward descent of punch 11 attached to upper tool 2. This causes the other end of component A to flare thereby forming the fixed tyre bead retaining flange. In order to prevent deflection of cam ring 10, the latter is provided with a retainer ring 14 which also acts as a retracting means for rectracting segmental contracting blocks 17. After the operation upper tool 2 returns to its normal position and pressure plate 4 ejects the profile component.

Figure 7:
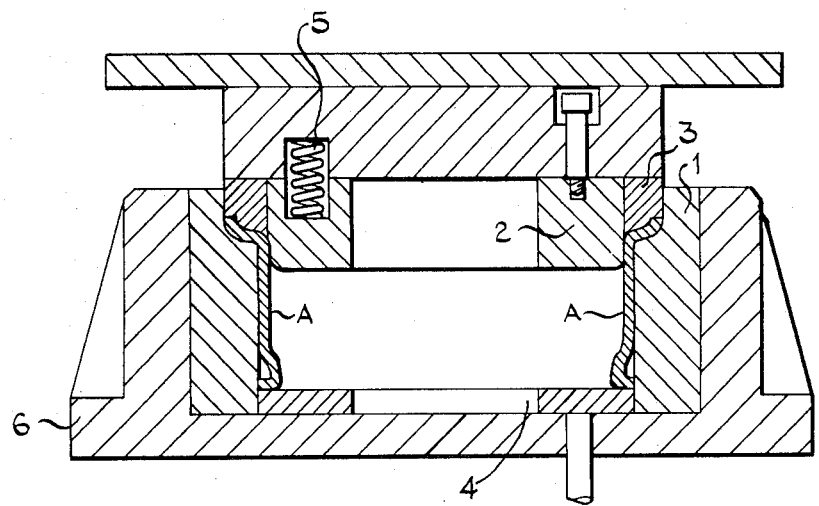

The tyre bead retaining flange formed in the operation described with reference to FIG. 6, is then subjected to compressing conditions, either in heated form or in the cold, in order to form the profile of the flange. If hot working is required, the flared flange portion is heated in a manner described herein. Thereafter the heated component is loaded into a press tool as shown in FIG. 7. The principle of operation of this tool is essentially that of the tool shown in FIG. 3. Component A is mounted on pressure plate 4, the component being located in a groove (not shown) on the upper surface of the pressure plate. The pressure plate is then lowered within the opening of an annular die 1 until it rests on bottom of the platform 6. With the lowering of the pressure plate 4 and the components A mounted thereon, a combination of lower and upper punches 2 and 3 mounted above die 1 and resiliently connected by means of a spring arrangement 5 descends on to the component. The spring arrangement 5 ensures that lower punch 2 moves in advance of upper punch 3 which provides support for the flared flange portion of the rim thus preventing buckling thereof. As the combination of punches 2 and 3 presses down into the opening of die 1, they press the flange portion of the component against the die whereby shaping the fixed flange section and in the case when the component is heated bringing about the desired increase in thickness at the radial corner of the flange where the bead seat joins it. After completion of the operation, pressure plate 4 ejects the component A after punch portion 2 and 3 is lifted.

In all the portions described with reference to FIGS. 2 to 7, the press cycle is adapted to be suitably linked to an automatic system for automatic loading and releasing of components in the various stages of their formation.

The rim resulting from the operations described with reference to FIGS. 2 to 7 is then subjected to a final operation in order to refine the final rim profile. This is achieved by means of a cold roll-forming procedure and as described with reference to FIG. 8 of the drawings. The roll-forming is generally effected on a heavy duty roll-forming machine with compressive variations being applied to the rim over either side as indicated by means of the arrows shown in FIG. 8. The chief object and achievement of such roll-forming is to ensure the refinement of the profile of the rim at both the gutter and fixed tyre bead retaining flange ends. Furthermore, the cold rolling also aids the rim metallurgically thereby increasing the fatigue life thereof.

The fully profiled rim which can then be radially expanded or circumfentially shrunk to reduce any lateral run-out is suitable for both two-piece and three-piece wheel & rim assemblies. A transverse section of a three-piece wheel & rim assembly incorporating the rim manufactured by the invention is illustrated in FIG. 9. As shown, the rim A is provided with an overall gutter section 19 at one end and a fixed tyre bead retaining flange 20 at the other. The radial corner of the gutter is indicated at 21 and the radial corner of the fixed flange at 22. Gutter 19 is adapted to receive a conventional split lockring 24 for locating therein a detachable tyre bead retaining flange 23.

FIG. 10 which is a fragmentary transverse sectional view of a two-piece wheel & rim assembly illustrates a rim A with an overall gutter section 19 adapted to receive a split tyre bead retaining ring 25.

Final FIG. 11 is simply a transverse section of a rim manufactured by the method of the present invention.

The method of the present invention thus results in the production of a rim for the wheels of both commercial load carrying and/or passenger service vehicles which not only ensures increased thickness at critical areas of heavy stress which effect is vital from the design point of view but is also capable of achieving a rim which is both safe and strong from conventional mill plate, sheet metal or strip steel.

It must be understood that various modifications of the method and apparatus of the invention are possible without departing from the scope of what has been disclosed herein.

We claim:

1. A method for the manufacture from low carbon steel strip or plate of rims for the wheels of both commercial load carrying and passenger service vehicles, each rim being composed of a base portion having a gutter for receiving a split lockring extending around one end and a fixed tyre bead retaining flange round the other, the method comprising bending a steel strip of substantially uniform predetermined thickness into the form of a circle and butt welding the contiguous axial edges to form a cylinder, cold working the cylinder in order to conform the diameter and dimensions thereof to subsequent operational requirements and simultaneously to flare one end of the cylinder to form the rim gutter, heating the flared gutter portion and subjecting the heated portion to compressive load in order to form a radially extending wall of the gutter and to increase the thickness of the said radially extending wall by as much as 50% and of the radial corner of the gutter by as much as 90% over the initial thickness of the strip, further heating the radially extending wall of the gutter and subjecting it to additional compressive load in order to increase the thickness of the entire gutter portion composed of said radially extending wall, gutter base and radial gutter corner, said increase in thickness in respect of the gutter base being as much as 50% and in respect of the radial gutter corner from 50% to 90% over the initial thickness of the strip, cold working the gutter end of the semi-formed rim in order to form the profile of the gutter, cold working also the opposite end of the rim in order to flare at least a portion thereof for formation of the tyre bead retaining flange, heating said flared flange portion and finally subjecting the flared tyre bead retaining flange portion to compressive load in order to form the profile to the tyre bead retaining flange, said compressive loading increasing the thickness of the strip at or near the radial corner of the flange by as much as 50% over the initial thickness of the strip.

2. A method for the manufacture from low carbon steel strip or plate of rims for the wheels of both commercial load carrying and passenger service vehicles, each rim being composed of a base portion having a gutter for receiving a split lockring extending around one end and a fixed tyre bead retaining flange round the other, the method comprising bending a steel strip of substantially uniform predetermined thickness into the form of a circle and butt welding the contiguous axial edges to form a cylinder, cold working the cylinder in order to conform the diameter and dimensions thereof to subsequent operational requirements and simultaneously to flare one end of the cylinder to form the rim gutter, heating the flared gutter portion, subjecting such flared and heated gutter portion to compressive load in two stages, firstly to increase the thickness of the strip in the area of the gutter portion in order to reflare it and the heating of the reflared gutter portion, and secondly to form the radially extending wall of the gutter and increase the thickness of the overall gutter portion composed of said radially extending wall, gutter base and radial gutter corner, said increase in thickness in respect of the gutter base being as much as 50% and in respect of the radial gutter corner from 50% to 90% over the initial thickness of the strip, cold working the gutter end of the semi-formed rim in order to form the profile of the gutter, cold working also the opposite end of the rim in order to flare at least a portion thereof for formation of the tyre bead retaining flange, heating said flared flange portion and finally subjecting the flared tyre bead retaining flange portion to compressive load in order to form the profile of the tyre bead retaining flange, said compressive loading increasing the thickness of the strip at or near the radial corner of the flange by as much as 50% over the initial thickness of the strip.

3. The method as claimed in claim 1 or claim 2, wherein the gutter and tyre bead retaining flange of the rim are finally roll-formed to impart to them the final rim profile.

4. The method as claimed in claim 1 or claim 2, wherein the gutter and tyre bead retaining flange are heated to a temperature in the range of from 850° to 1100° C.

5. The method as claimed in claim 1 or claim 2, wherein the cold working effected in order to confirm the diameter and dimensions of the cylinder to subsequent operational requirements and in order to flare and form the gutter is effected by means of segmental dies operating from within the cylinder in a radially outward direction.

6. The method as claimed in claim 1 or claim 2, wherein the cold working effected to form the profile of the gutter end to flare and form the tyre bead retaining flange is effected by means of segmental dies operating on the cylinder in a radially inward direction.

7. The method as claimed in claim 1 or claim 2, wherein the compressive loading to which the cylinder is subjected and the reflaring of the initially thickened gutter portion is effected by means of press tools.

8. A rim for the wheel of a commercial load carrying or passenger service vehicle whenever manufactured from low carbon steel strip or plate by the method claimed in claim 1 or claim 2.

9. The rim as claimed in claim 8, which is a 5° taper base/flat base rim.

10. Apparatus for the manufacture of a rim for the wheel of a commercial load carrying or passenger service vehicle, which apparatus comprises in combination means for bending steel strip and butt welding the edges thereof to form a cylindrical component and a plurality of press tools for converting the component into a rim wherein at least one of the press tools comprises an annular die having located within the opening thereof support means adapted ascend and or descend within such opening and on which a cylindrical component to be formed into the rim is adapted to be located above the bottom of said annular die, and pressure means mounted above the die and adapted to engage therewith through its opening in such a way as to subject the component to compressive load against the inner surface of the die whereby the contour of the die or of the die and the pressure means is imparted to the component, wherein the pressure means comprises a combination of upper and lower punch tools resiliently interconnected and so formed that when the combination descends, only the lower punch tool moving in advance of the upper punch tool providing lateral support to the component and thus preventing its buckling under the substantially vertical pressure to which it is subjected by the upper punch tool.

11. The apparatus as claimed in claim 10, wherein the support means located within the die opening comprises a pressure plate having provided on its upper surface a peripheral groove within which the cylindrical component is adapted to be located and retained.

12. The apparatus as claimed in claim 10 or claim 11, wherein the die is located within an overall housing or holder.

13. The apparatus as claimed in claim 10 or claim 11, wherein the resilient means inter-connecting the upper and lower punch tools consists of an arrangement of springs.

14. The apparatus as claimed in claim 10 or claim 11, wherein the pressure means includes a stripper device acting in conjunction with the upper punch tool to assist in providing the required profile to the component.

* * * * *